US006788816B1

(12) United States Patent
Kiyuna

(10) Patent No.: US 6,788,816 B1
(45) Date of Patent: Sep. 7, 2004

(54) CONTOUR EXTRACTION METHOD AND APPARATUS

(75) Inventor: Tomoharu Kiyuna, Tokyo (JP)

(73) Assignee: NEC Corporation (JP)

( * ) Notice: Subject to any disclaimer, the term of this patent is extended or adjusted under 35 U.S.C. 154(b) by 637 days.

(21) Appl. No.: 09/666,150

(22) Filed: Sep. 20, 2000

(30) Foreign Application Priority Data

Sep. 24, 1999 (JP) .......................................... 11-269660

(51) Int. Cl.[7] .............................................. G06K 9/48
(52) U.S. Cl. ..................................................... 382/199
(58) Field of Search ............................... 382/190, 195, 382/199, 200, 201, 243, 266

(56) References Cited

U.S. PATENT DOCUMENTS

| | | | | |
|---|---|---|---|---|
| 4,538,227 A | * | 8/1985 | Toraichi et al. .............. | 378/62 |
| 5,081,689 A | * | 1/1992 | Meyer et al. ............... | 382/199 |
| 5,119,439 A | * | 6/1992 | Osawa et al. ............... | 382/199 |
| 5,168,530 A | * | 12/1992 | Peregrim et al. ........... | 382/199 |
| 5,420,971 A | * | 5/1995 | Westerink et al. .......... | 382/199 |
| 5,617,487 A | * | 4/1997 | Yoneyama et al. ......... | 382/199 |
| 5,881,171 A | * | 3/1999 | Kinjo ......................... | 382/199 |
| 5,933,527 A | * | 8/1999 | Ishikawa .................... | 382/190 |
| 6,289,136 B1 | * | 9/2001 | Oshino et al. .............. | 382/298 |
| 6,289,499 B1 | * | 9/2001 | Rieger et al. ................ | 716/21 |
| 6,529,630 B1 | * | 3/2003 | Kinjo ......................... | 382/190 |

FOREIGN PATENT DOCUMENTS

| | | |
|---|---|---|
| JP | 9-299366 | 11/1997 |
| JP | 11-313807 | 11/1999 |

OTHER PUBLICATIONS

Kita, et al. "Extraction of Accurate Stomach Contour from X–ray Images of Barium Filled Stomachs", IEEE, pp. 917–919, 1988.*
Hara, et al. "Automatic feature extraction of facial organs and contour", IEEE, pp. 386–391, 1997.*
A.P. Dempster, et al., "Maximum Likelihood From Incomplete Data Via the EM Algorithm", *Proceedings of the Royal Statistical Society*, 1977, pp. 1–38.

* cited by examiner

Primary Examiner—Daniel Mariam
(74) Attorney, Agent, or Firm—Dickstein, Shapiro, Morin & Oshinsky, LLP.

(57) ABSTRACT

A contour extraction method and apparatus is disclosed by which a contour can be extracted automatically at a high speed with a high degree of accuracy without the necessity to set a threshold value explicitly. In the contour extraction method and apparatus, from picture image data of a picture image including an image of a body which makes an object of contour extraction, region belonging probabilities with which individual points of the picture image belong to regions are calculated not based on values themselves of the image data but based on attributes of the points of the picture image. Then, the regions to which the individual points of the picture image belong are delimited using the region belonging probabilities, and then a boundary between the regions is extracted as a contour.

20 Claims, 12 Drawing Sheets

CONTOUR EXTRACTION METHOD AND APPARATUS

BACKGROUND OF THE INVENTION

1. Field of the Invention

The present invention relates to an image processing method and apparatus, and more particularly to a method of and an apparatus for extracting, from image data of a picture image including an image of a body which makes an object of contour extraction, a contour of the object body based on attributes of individual points of the picture image. More specifically, the present invention relates to a contour extraction method and apparatus suitably applied to an apparatus which extracts a particular area such as an internal organ or a tumor from image data of a picture image picked up by an MRI apparatus or a CT scanning apparatus.

2. Description of the Related Art

Various proposals have conventionally been made to extract an image of a particular body from a given picture image. For example, a contour extraction apparatus is disclosed in Japanese Patent Laid-Open No. 299366/1998 (hereinafter referred to as "document 1") which extracts, based on image data representative of a tomographic image of an internal organ from an ultrasonic diagnosis system or an MRI picture image, a region of the internal organ or a region of a tissue. In the contour extraction apparatus, in order to allow a region of an appropriate size to be extracted using a suitable threshold value, when a finite difference between time series data representative of an area within an extracted contour and smoothed data of the time series data of a plurality of tomographic images obtained at predetermined frame time intervals exceeds a predetermined threshold value, the threshold value for the contour extraction is varied and contour extraction is preformed again with the varied threshold value.

In the apparatus disclosed in the document 1 mentioned above, whether each point of a picture image of image data is an internal point or an external point of an area is first determined using a predetermined first threshold value based on a criterion of whether or not the value of the point exceeds the threshold value. Then, the area or the volume of the region determined by the method described above is determined from the picture images at the different times, and the time series data of the area or the volume of the region are smoothed, whereafter it is discriminated whether or not a finite difference between the data before smoothing and the data after smoothing exceeds a second threshold value.

If it is discriminated that the finite difference exceeds the second threshold value, the first threshold value is varied and the contour extraction performed first is performed again with the varied first threshold value.

The conventional contour extraction apparatus disclosed in the document 1 mentioned above, however, has the following problems.

First, while the apparatus disclosed in the document 1 uses two different threshold values in order to extract a region, a detailed method for determining the threshold values is not disclosed in the document 1, and each time data which make an object of region extraction changes, the threshold values must be determined by a trial-and-error scheme.

However, for example, with regard to an MRI image, since the appropriate threshold values vary depending upon of which part of the human body the tomographic picture image is, the apparatus disclosed in the document 1 has a problem that, if an inappropriate threshold value is used, then the contour of an internal organ different from an intended internal organ is extracted in error.

Second, the apparatus disclosed in the document 1 has a problem that, since it is necessary to use time series data of picture image data, a large amount of data is required in order to determine one region extraction picture image.

Third, in the apparatus disclosed in the document 1, a finite difference between data before smoothing and data after smoothing is calculated, and when the finite difference exceeds the second threshold value, it is necessary to vary the first threshold value and repeat the same procedure with the varied first threshold value. Therefore, the apparatus disclosed in the document 1 has a problem that a large amount of calculation time is required.

SUMMARY OF THE INVENTION

It is an object of the present invention to provide a contour extraction method and apparatus by which a contour can be extracted at a high speed with a high degree of accuracy without the necessity for setting a threshold value explicitly.

In order to attain the object described above, according to the present invention, from picture image data of a picture image including an image of a body which makes an object of contour extraction, region belonging probabilities with which individual points of the picture image belong to regions are calculated not based on values themselves of the image data but based on attributes of the points of the picture image, and the regions to which the individual points of the picture image belong are delimited using the region belonging probabilities, and then a boundary between the regions is extracted as a contour.

More particularly, according to an aspect of the present invention, there is provided a contour extraction method for delimiting, from picture image data of a picture image including an image of a body which makes an object of contour extraction, regions to which individual points of the picture image belong based on attributes of the points of the picture image and extracting a boundary between the regions as a contour, comprising a first step of initializing parameters which define a mixed probability distributions of the attributes of the points of the picture image, a second step of calculating region belonging probabilities with which the points of the picture image belong individually to the regions, a third step of updating the parameter so that the mixed probability distribution may be increased, a fourth step of calculating an evaluation function to be used as a scale for favorableness of estimation from the mixed probability distribution defined by the updated parameters, a fifth step of delimiting the regions to which the points of the picture image belong based on the region belonging probabilities, a sixth step of extracting a boundary between the delimited regions, and a seventh step of discriminating based on the region belonging probabilities whether or not the points of the picture image are region internal points which are points within a determined one of the regions or region external points which are points outside the determined region.

Preferably, the second, third and fourth steps are repetitively performed until a condition determined in advance is satisfied.

The fifth step of delimiting the regions to which the points of the picture image belong may include the steps of determining one region internal point and setting the region internal point as an initial set to a region internal point set, acquiring neighboring points to the point belonging to the region internal point set and setting the neighboring points as an initial set to a boundary candidate set, selecting one of the points of the boundary candidate set which belongs to the region internal point set and adding the selected point to the region internal point set, sending, at a point of time at which there remains no point to be newly added to the region internal point set any more, the region internal point set to the sixth step, acquiring, when the region internal point set is to be selected, neighboring points to each of the points belonging to the boundary candidate set and adding the points which belong to the boundary candidate set to the region internal point set if all of the neighboring points are region internal points, adding, if the neighboring points include at least one region external point, the point or points which belong to the boundary candidate set to a boundary point set, and adding one or those of the region internal points belonging to the neighboring points which are not added to the region internal point set to the boundary candidate set.

The sixth step of extracting a boundary between the delimited regions may include the steps of setting an initial value to an ordered boundary point set, adding an intermediate point between adjacent ones of those points which belong to the ordered boundary point set, moving the intermediate point until the intermediate point becomes a boundary point and repeating the addition of an intermediate point and the movement while a new intermediate point can be added, and adding, upon the movement of each of the intermediate points, the intermediate point to the ordered boundary point set if the intermediate point already is a boundary point, but moving the intermediate point toward the outer side of the region if the intermediate point is a region internal point, but otherwise moving the intermediate point toward the inner side of the region if the intermediate point is a region external point.

Preferably, the contour extraction method further comprises an eighth step of coarse graining the picture image, a ninth step of subdividing the coarse grained picture image, and a tenth step of deleting those points which belong to a predetermined region with low probabilities.

The mixed probability distribution may be used as the evaluation function.

As an alternative, a structural risk calculated from the mixed probability distribution and the number of the parameters may be used as the evaluation function.

As another alternative, a description length calculated from the mixed probability distribution and the number of the parameters may be used as the evaluation function.

As a further alternative, Akaike information criteria calculated from the mixed probability distribution and the number of the parameters may be used as the evaluation function.

According to another aspect of the present invention, there is provided a contour extraction apparatus for delimiting, from picture image data of a picture image including an image of a body which makes an object of contour extraction, regions to which individual points of the picture image belong based on attributes of the points of the picture image and extracting a boundary between the regions as a contour, comprising first means for initializing parameters which define a mixed probability distributions of the attributes of the points of the picture image, second means for calculating expected values of a region belonging probability with which the points of the picture image belong individually to the regions, third means for updating the parameter so that the mixed probability distribution may be increased, fourth means for calculating an evaluation function to be used as a scale for favorableness of estimation from the mixed probability distribution defined by the updated parameters, fifth means for delimiting the regions to which the points of the picture image belong based on the values of the region belonging probabilities, sixth means for extracting a boundary between the delimited regions, and seventh means for discriminating based on the region belonging probabilities whether or not the points of the picture image are region internal points which are points within a determined one of the regions or region external points which are points outside the determined region.

Preferably, the contour extraction apparatus further comprises eighth means for coarse graining the picture image, ninth means for subdividing the coarse grained picture image, and tenth means for deleting those points which belong to a predetermined region with low probabilities.

With the contour extraction method and apparatus, from picture image data of a picture image including an image of a body which makes an object of contour extraction, region belonging probabilities with which individual points of the picture image belong to regions are calculated based on attributes of the points of the picture image, and the regions to which the individual points of the picture image belong are delimited using the region belonging probabilities, and then a boundary between the regions is extracted as a contour. Consequently, there is an advantage that a contour of each region can be extracted automatically without the necessity to set a threshold value for region delimitation explicitly and contour region extraction can be performed at a higher speed than ever.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
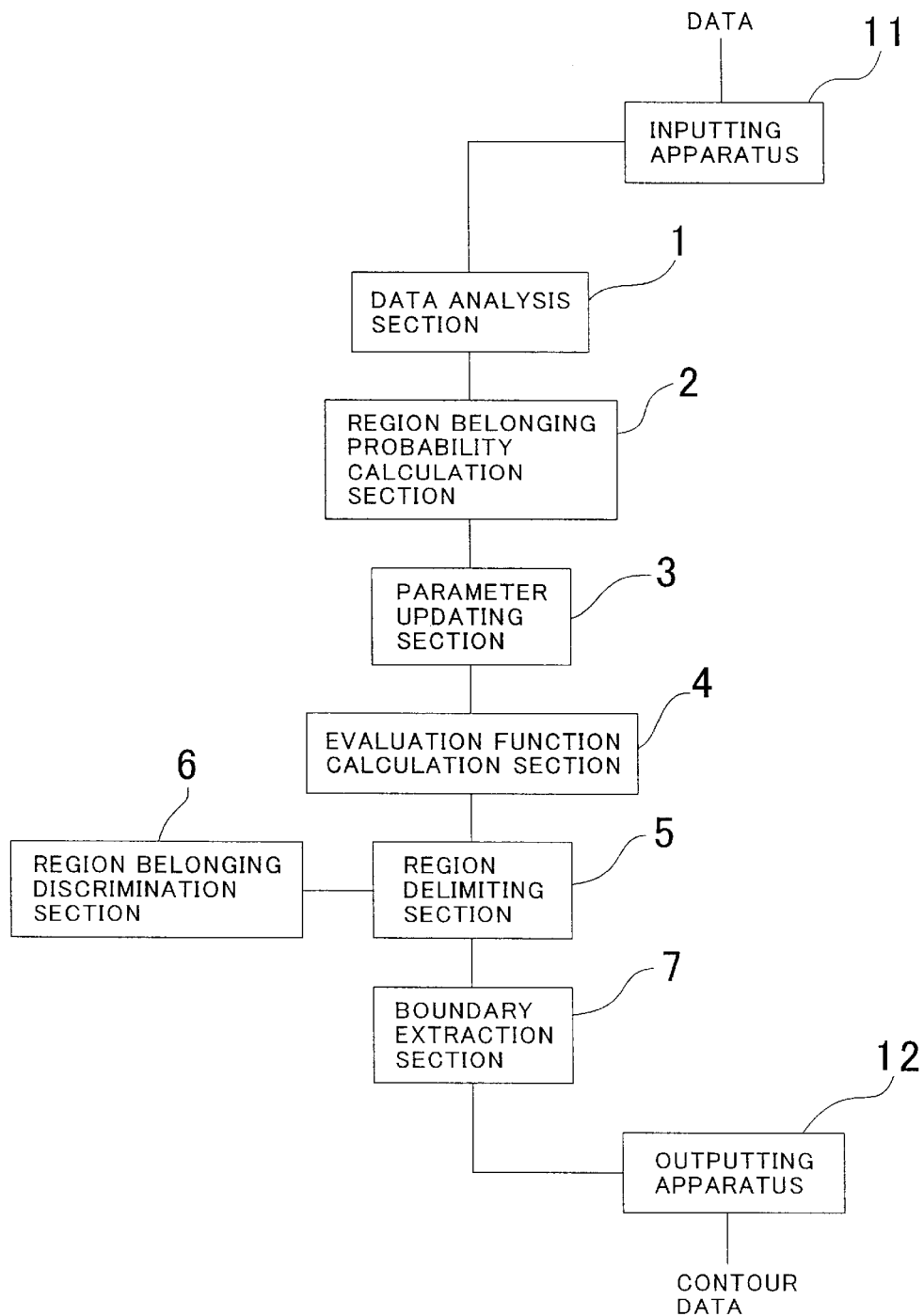
FIG. 1 is a block diagram showing a contour extraction apparatus to which the present invention is applied.

In the following, preferred embodiments of the present invention are described. The region contour extraction method of the present invention comprises the steps of calculating, from picture image data of a picture image including an image of a body which makes an object of contour extraction, region belonging probabilities with which individual points of the picture image belong to regions based on attributes of the points of the picture image, delimiting the regions to which the individual points of the picture image belong using the region belonging probabilities, and extracting a boundary between the regions as a contour.

According to the present invention, the contour extraction apparatus for delimiting, from picture image data of a picture image including an image of a body which makes an object of contour extraction, regions to which individual points of the picture image belong based on attributes of the points of the picture image and extracting a boundary between the regions as a contour comprises first means for initializing parameters which define a mixed probability distributions of the attributes of the points of the picture image, second means for calculating expected values of a region belonging probability with which the points of the picture image belong individually to the regions, third means for updating the parameter so that the mixed probability distribution may be increased, fourth means for calculating an evaluation function to be used as a scale for favorableness of estimation from the mixed probability distribution defined by the updated parameters, fifth means for delimiting the regions to which the points of the picture image belong based on the values of the region belonging probabilities, sixth means for extracting a boundary between the delimited regions, and seventh means for discriminating based on the region belonging probabilities whether or not the points of the picture image are region internal points which are points within a determined one of the regions or region external points which are points outside the determined region.

In the present invention, a probability with which each point of a picture image belongs to a given region is calculated based on a value of the point, and a contour is extracted using a thus determined probability distribution.

In the following, a principle and operation of the present invention are described in connection with an example wherein the present invention is applied to a method of classifying an MRI picture image of the head of a human being into three regions including a region of the brain, a region of the scalp and a region other than the brain and the scalp.

It is to be noted that, while, in the following description, a term "region extraction" is sometimes used in place of the term "contour extraction", they may be considered synonyms because, if a region can be extracted, then the contour can be obtained by drawing a line along the boundary of the extracted region.

First, where a picture image belongs to an ith region, the probability with which the value of the luminance of a jth point on the picture image (in the following description, a point on a picture image is referred to as "pixel") is yj is represented by $$f(yj|\theta i)$$

where $\theta i$ is a parameter representative of an attribute of the ith region. The property of a region may be, for example, a mean, a variance or the like of values of pixels which belong to the region.

However, before extraction of a region is performed, naturally a mean or a variance of each region cannot be defined.

In the present invention, as a probability distribution for pixel values of a given picture image, a mixed probability distribution which is a weighted mean of probabilities of individual regions is used.

Where a picture image has totaling n pixels, the mixed probability distribution $P(\theta|Y^n)$ when all pixel values $$Y^n = \{y1, \ldots, yn\}$$

are given is given by the following expression (1):

$$P(\theta|Y^n) = \Sigma i \Sigma j \; wi \; f(yj|\theta i) \qquad (1)$$

where wi is a ratio at which each region occupies in the overall picture image, and $\theta$ is a representation of all parameters wi and $\theta i$.

In the following description, the mixed probability distribution $P(\theta|Y^n)$ is regarded as a function of the parameter $\theta$ and referred to as mixed likelihood.

In the present invention, in order to perform contour extraction, it is necessary to appropriately detect to which region each pixel belongs. To this end, a mixed likelihood which describes a distribution of determined pixel values best should be determined.

Particularly, a parameter with which the mixed probability is maximized should be determined. This is a method called maximum likelihood method in the statistics. In the maximum likelihood method, a mixed logarithmic likelihood (likelihood function) defined by the following expression (2) may alternatively be maximized:

$$L(\theta|Y^n) = \log[P(\theta|Y^n)] \qquad (2)$$

However, for example, where a mean pixel value and a variance of pixel values are used as attributes of a region, it is necessary to determine a mixed ratio w and a mean value and a variance of pixels for each region, and this is difficult if regions are not extracted in advance.

In order to solve the problem just described, in the present invention, a hidden variable Z which indicates to which region each pixel belongs is employed newly, and a mixed likelihood is maximized using an estimated value of the variable. In the process of maximization of the likelihood, the mixed ratio w and the mean value and the variance of pixels of each region can be estimated simultaneously. The principle is such as follows.

If the mixed logarithmic likelihood when data $Y_n$ are given is re-written so that it may include the variable Z using the Bayes' formula, then it is given by the following expression (3):

$$L(\theta|Y^n) = L(\theta, Y^n|Z) - L(Z|\theta, Y^n) + \log[P(Z)/P(Y^n)] \qquad (3)$$

where P(Z) and $P(Y^n)$ are distributions called prior distributions of Z and $Y_n$. Since the prior distributions P(Z) and $P(Y^n)$ do not include $\theta$ and are independent of the maximization of the mixed logarithmic likelihood, they are regarded as constants and ignored in the following description.

Now, if the initial value of $\theta$ is represented by $\theta 0$ and the opposite sides of the expression (3) above are multiplied by the probability distribution $P(Z|\theta, Y^n)$ of Z with data and a parameter given to determine an expected value regarding z, the following expression (4) is obtained:

$$L(\theta|Y^n) = Q(\theta, \theta 0) + H(\theta, \theta 0) \qquad (4)$$

where $$Q(\theta, \theta 0) = E\theta L(\theta 0, Y^n|Z) = \Sigma Z \; P(Z|\theta, Y^n) L(\theta 0, Y^n|Z) \qquad (5)$$

is an expected value of $L(\theta 0, Y^n|Z)$, and $$H(\theta 0, \theta 0) = -E\theta L(Z|\theta 0, Y'') = -\Sigma Z\, P(Z|\theta, Y'')L(Z|\theta 0, Y'') \quad (6)$$

is an expected value of $L(Z|\theta 0, Y'')$.

It can be proved easily that the expected value $H(\theta, \theta 0)$ always satisfies $$H(\theta 0, \theta 0) \leq H(\theta, \theta 0)$$

Accordingly, if new $\theta$ is set so as to satisfy $$Q(\theta 0, \theta 0) \leq Q(\theta, \theta 0)$$

then a parameter which maximizes the mixed logarithmic likelihood can be determined.

A method of maximizing a likelihood where virtual data (in the example described above, Z) which cannot be observed directly are present as described above is conventionally known as an EM algorithm in the field of the statistics. The EM algorithm is discussed in detail, for example, in A. P. Dempster et al., "Maximum Likelihood from Incomplete Data via the EM Algorithm", Proceedings of the Royal Statistical Society, 1977, pp. 1–38.

If a parameter $\theta^*$ which maximizes the mixed logarithmic likelihood is obtained through the process described above, an expected value of z determined using the parameter $\theta^*$ can be regarded as a region belonging probability with which each pixel belongs to each region.

For example, if it is assumed that $z(j, i)$ is a variable which assumes 1 when the jth pixel belongs to the ith region, but assumes 0 when the jth pixel belongs to any other region, the expected value $$h(j, i) = E\theta^* z(j, i)$$

of the same is a region belonging probability which assumes a value between 0 and 1.

In the present invention, the value of the region belonging probability is used to delimit a region.

For example, if it is assumed that, of a picture image,
a region which corresponds to the brain is represented as region 2,
a region corresponding to the scalp is represented as region 1, and
any other region is represented as region 0, then those pixels which belong to the region of the brain should be selected from those pixels which have high values of $h(j, 2)$. Similarly, the region of the scalp and the other region can be extracted by selecting those pixels which have high values of $h(j, 1)$ and $h(j, 0)$, respectively.

In this manner, in the present invention, different regions can be delimited distinctly using the region belonging probability, and contour extraction of each of the delimited regions can be performed automatically regarding the pixels on the boundary between the delimited regions as a contour.

The present invention is described in more detail with reference to the accompanying drawings. It is to be noted that various symbols used in the following description are used in the same method of use of the symbols as in the foregoing description. Further, in the embodiments described below, a method wherein three regions of a brain region, a scalp region and an external region are extracted from a tomographic picture image of the head of a human being picked up by an MRI apparatus and the contours of the regions are determined is described as an example. However, a similar method can be applied also where the contour of the heart or the breast of the body of a human being or some other internal organ is extracted. Further, a similar method can be applied also to a picture image picked up by an apparatus other than an MRI apparatus such as, for example, a CT scanning apparatus or an ultrasonic diagnosis apparatus.

Figure 5:
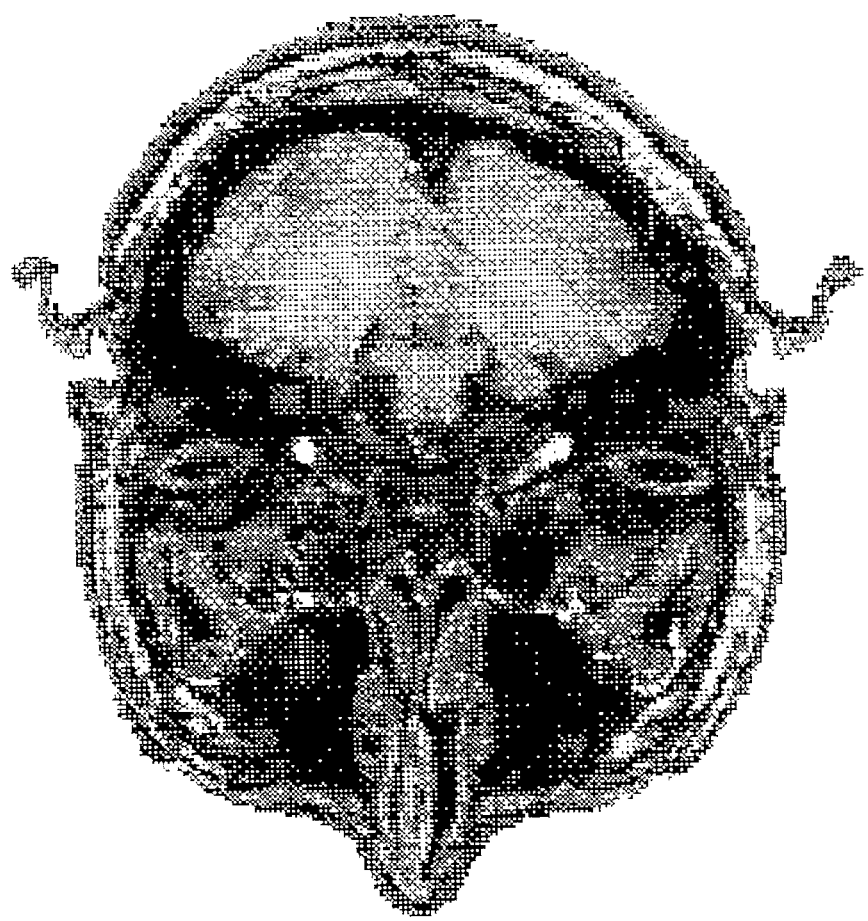
FIG. 5 is a tomographic image of the head of a human being picked up using an MRI apparatus.

An MRI picture image is represented with the luminance of each point (hereinafter referred to as "pixel") of the picture image as seen in FIG. 5. The luminance typically assumes one of values from 0 to 255, and as the luminance values of the pixels increase, the picture image is displayed brighter white. The contour extraction uses the luminance value as a key to delimit a region such that those pixels having proximate luminance values are determined to belong to the same region. In the following description, the region other than the head is represented as region 0, the scalp as region 1, and the brain as region 2.

Further, in the present embodiment, a mean luminance $\mu i$ and a variance $\sigma i^2$ ($i=0, 1, 2$) of pixels belonging to each region are used as parameters which characterize the region. In the following description, the parameters are referred to as "region parameters".

Referring first to FIG. 1, there is shown a contour extraction apparatus to which the present invention is applied. The contour extraction apparatus shown includes a data analysis section 1 for receiving picture image data of a picture image picked up by an MRI apparatus or the like from an inputting apparatus 11 and analyzing a property of the input picture image data, a region belonging probability calculation section 2 for calculating a region belonging probability of each pixel of a given picture image based on a value of the pixel, a parameter updating section 3 for updating a region parameter so that the value of an evaluation function may be increased or decreased, an evaluation function calculation section 4 for calculating an evaluation function from the updated region parameter, a region delimiting section 5 for determining, based on an estimated region belonging probability, to which region each pixel belongs, a region belonging discrimination section 6 for discriminating whether or not a designated one of those pixels which form the boundary between regions belongs to a designated region, a boundary extraction section 7 for producing an ordered contour line from an extracted region, an inputting apparatus 11 for inputting a picture image which makes an object of contour extraction, and an outputting apparatus 12 for outputting a result of the contour extraction.

Figure 2:
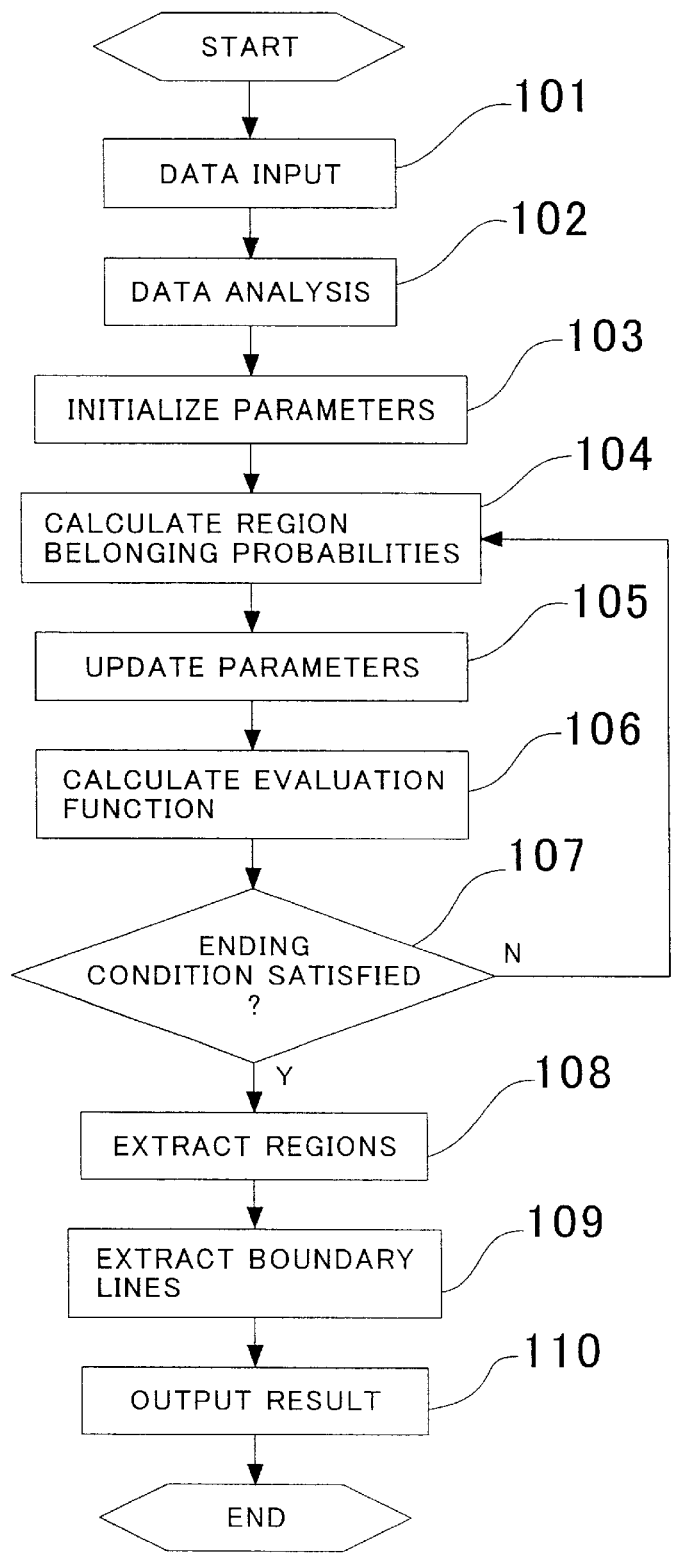
FIGS. 2 to 4 are flow charts illustrating operation of the contour extraction apparatus of FIG. 1.
Figure 3:
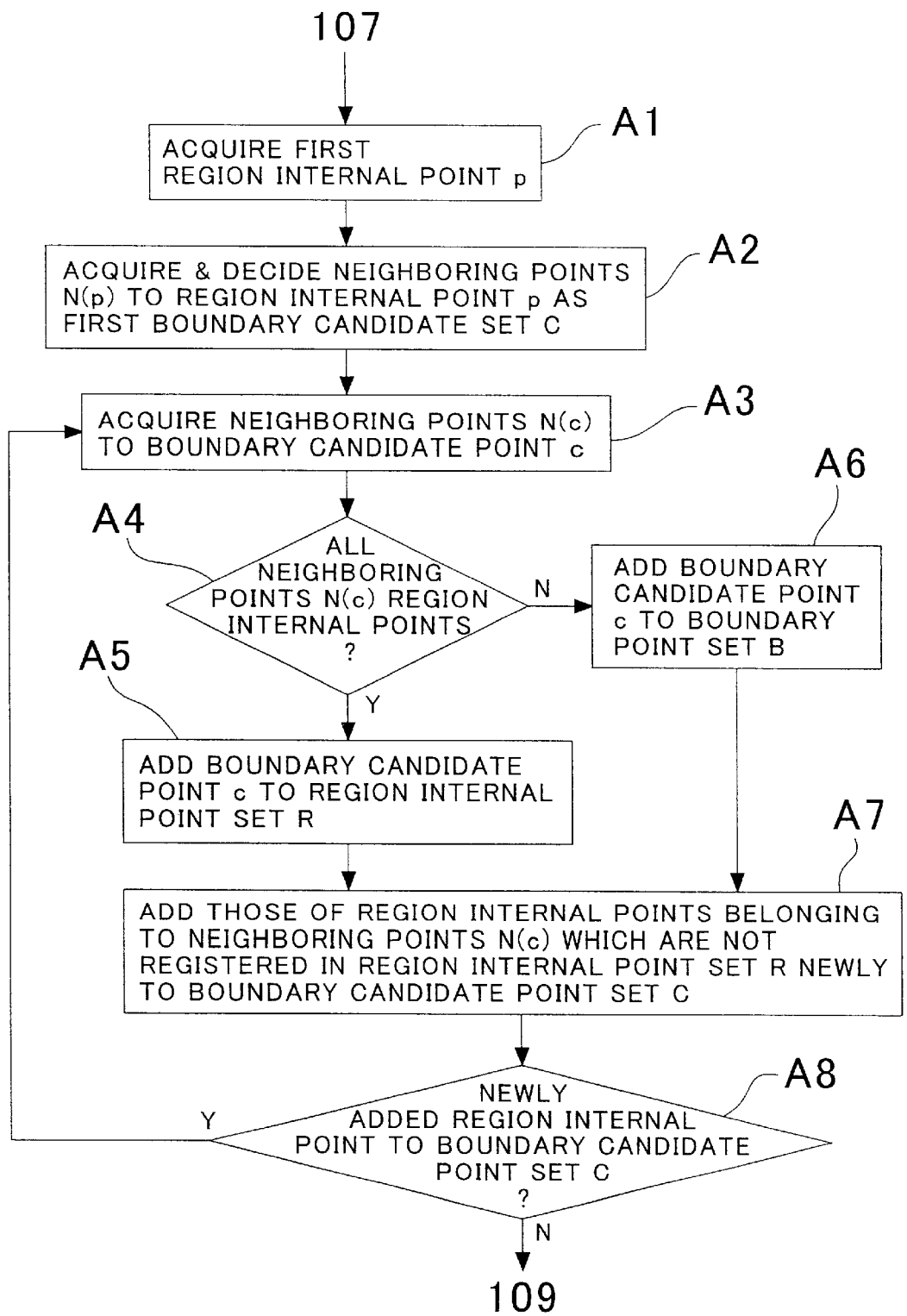
Figure 4:
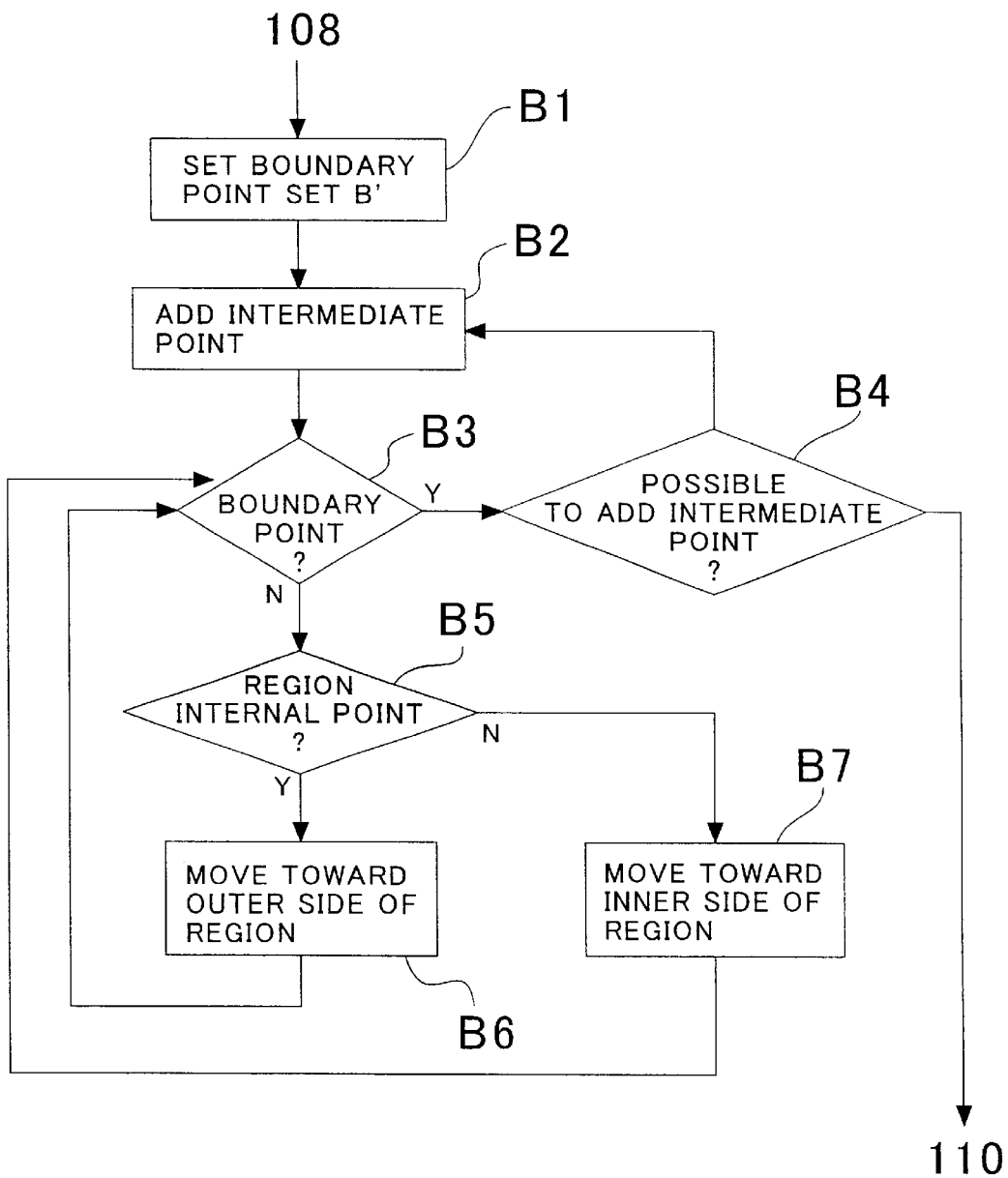

Now, a process for contour extraction of the contour extraction apparatus of FIG. 1 is described with additional reference to FIGS. 2 to 4.

First, picture image data of a picture image of the head of a human being picked up by an MRI apparatus or the like are inputted from the inputting apparatus 11 (step 101). The inputting apparatus 11 may be implemented using, for example, a picture image scanner. Alternatively, it is possible to input picture image data from an MRI apparatus or the like directly to the contour extraction apparatus over a computer network. The inputting apparatus 11 sends the thus read data to the data analysis section 1.

The data analysis section 1 analyzes properties of the data read in in step 101 (step 102). The properties of the data may be, for example, a mean and a variance of all pixel values.

The data analysis section 1 decides, based on the properties, initial values to region parameters which characterize individual regions (step 103). For example, in the case of an MRI picture image of the head of a human being, the region of the brain has the highest luminance while the external region is represented by the lowest luminance, and the area of the scalp has an intermediate luminance. Accordingly, for example, a mean and a variance of pixel values are used as the region parameters which characterize the different regions, and the initial values to the mean value $\mu i$ (i=0, 1, 2) of pixel values of the regions 0, 1 and 2 are determined in accordance with the following expression (7):

$$\mu i = a i \mu \quad (7)$$

where $\mu$ is the mean value of all pixels, and ai is the weight coefficient and is set, for example, to a0=1/6, a1=2/6, and a2=3/6.

Where the initial values are selected in this manner, updating of a parameter in optimization of an evaluation function converges rapidly.

For the variance $\sigma i^2$, for example, the initial value for the region 0 (region other than the head) is set to a low value while the variance of the overall picture image may be used as it is as the initial values for the other regions.

The mixed ratios w for the regions may be initialized all equally to ⅓ where the number of regions to be delimited is 3.

Then, the region belonging probability calculation section 2 calculates the probability with which each pixel belongs to each region (step 104).

The following method may be used to specifically determine a region belonging probability.

If it is known in advance whether or not the jth pixel belongs to the ith region, then the mixed probability defined with the expression (1) given hereinabove is given by the following expression (8):

$$P(\theta|Y^n) = \Sigma i \Sigma j \; z(j, i) w i \; f(yj|\theta i) \quad (8)$$

where z(j, i) is a variable which assumes 1 when the jth pixel belongs to the ith region but assumes 0 in any other case. Since this variable cannot be observed actually, an expected value h(j, i) for it is determined and used as the region belonging probability. The region belonging probability is given specifically by the following expression (9):

$$h(j, i) = E\theta^* z(j, i) = wi \; f(yj|\theta i)/\Sigma i\Sigma j \; wi \; f(yj|\theta i) \quad (9)$$

Then, the parameter updating section 3 varies the region parameters wi and $\theta$ so that the mixed probability distribution may increase (step 105).

Here, description is given particularly taking a case wherein the probability distribution $f(yj|\theta i)$ of the region conforms with normal distributions of the mean $\mu i$ and the variance $\sigma i^2$ as an example.

As described hereinabove, in order to maximize the mixed probability, the parameters w, $\mu$ and $\sigma i^2$ should be updated so as to maximize the expected value Q defined by the expression (5) given hereinabove.

More particularly, the region parameters are updated in the following manner:

$$wi = \Sigma jh(j, i)/n \quad (10)$$

$$\mu i = \Sigma jxjh(j, i)/\Sigma jh(j, i) \quad (11)$$

$$\sigma i^2 = \Sigma j(xj-\mu i)h(j, i)/\Sigma jh(j, i) \quad (12)$$

The parameter updating section 3 sends the updated region parameters to the evaluation function calculation section 4.

The evaluation function calculation section 4 calculates an evaluation function using the region parameters updated by the parameter updating section 3 (step 106).

For the evaluation function, the mixed probability distribution (1) itself may be used. In this instance, a higher mixed distribution value results in a better estimation result. Alternatively, however, a structural risk or a description length may be used as the evaluation function. Furthermore, the Akaike's information amount (AIC: Akaike Information Criteria) may be used instead.

The evaluation functions mentioned above are calculated from a mixed distribution and the number of region parameters and exhibit a lower value as the mixed likelihood increases or as the number of region parameters to be used decreases.

Accordingly, in the evaluation functions, a lower value indicates a better estimation result. A calculation method of the evaluation functions has been invented by the inventor of the present application and filed for patent in Japan as Japanese Patent Application No. 124851/1998.

In step 107, the evaluation function calculation section 4 compares an evaluation function value calculated using the updated region parameters with another valuation function value calculated in the preceding cycle using the region parameters before updated. If the difference between the two evaluation function values is smaller than a predetermined value, then the processing advances to step 108, but in any other case, the processing returns to step 104 so that the region belonging probabilities are calculated again using the new region parameters.

The region parameters and the region belonging probabilities which maximize the mixed probability distribution can be determined by repeating the processing in steps 104 to 107 described above.

After the maximization of the mixed probability distribution is completed, the evaluation function calculation section 4 sends the region belonging probabilities and the region parameters obtained by the maximization to the region delimiting section 5.

The region delimiting section 5 delimits the regions based on the region belonging probabilities (step 108).

In order to particularly give an example of the processing of the region delimiting section 5, a procedure of extracting a region corresponding to the brain from the MRI picture image of the head of a human being shown in FIG. 5 is described as an example. However, also for any other region, the processing can be executed in a quite similar procedure.

Figure 6:
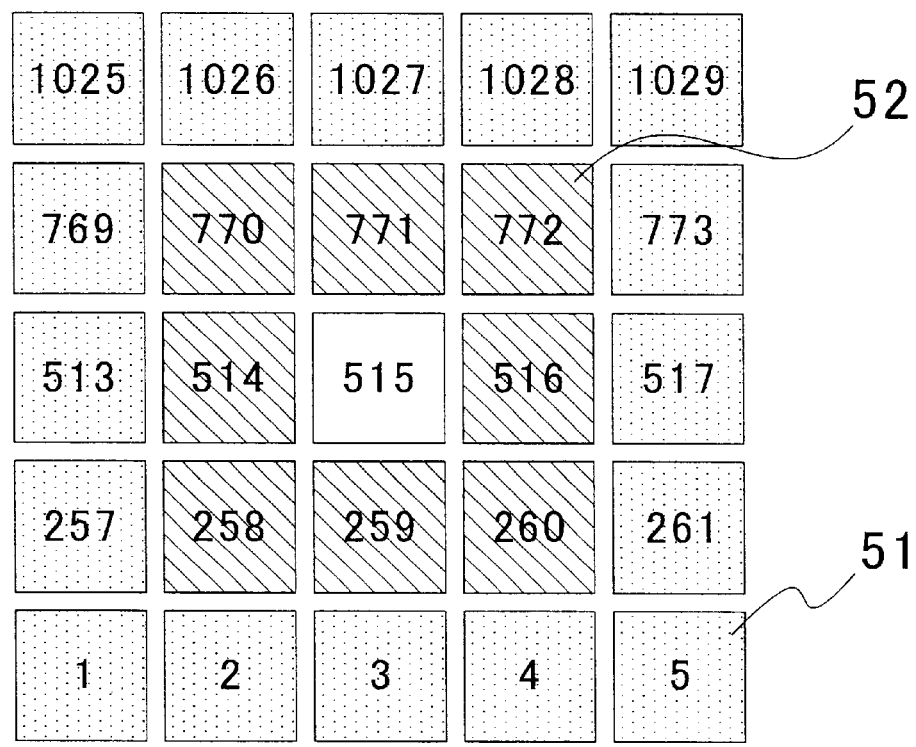
FIG. 6 is a diagrammatic view illustrating neighboring points to a pixel which composes image data.

It is assumed that pixels 51 individually have numbers applied in advance thereto as seen in FIG. 6.

Each extracted region is represented by a set of such numbers. If a region 52 surrounded by pixels indicated by dots is represented by R, then the region R can be represented using the numbers of pixels as

R={258, 259, 260, 514, 515, 516, 770, 771, 772}

Also a boundary line which delimits a region and the outside of the region can be represented similarly as a set of pixel numbers.

For example, a boundary line B indicated using the set 52 of pixels surrounded by the pixels indicated by dots can be represented using the number of pixels as

B={258, 259, 260, 514, 516, 770, 771, 772}

In this instance, the set R (hereinafter referred to as "region internal point set") of internal points of the region surrounded by the boundary line is composed of a single pixel (515).

Where a region corresponding to the brain is represented as region 2, the region delimiting section 5 sends the values of the region belonging probability (h, 2) of the pixels to the region belonging discrimination section 6.

If a signal representing that the pixel which is an object of discrimination belongs to the region of the brain is returned from the region belonging discrimination section 6, then the pixel is determined as a first region internal point p (step A1 of FIG. 3).

In a region belonging discrimination method, it is regarded that the pixel belongs to the region, for example, when the value of h(j, 2) is higher than 0.9 or is not lower than 0.1. Actually, since the finally obtained value of the region belonging probability of the point which does not belong to the region is almost equal to 0.0, there is no necessity of explicitly setting a threshold value.

Then, a set N(p) of neighboring points to the region internal point p is acquired, and this is determined as a first boundary candidate set C (step A2). The neighboring point set N(p) signifies a set of points neighboring to the point p. For example, the neighboring point set N(515) to the 515th point in FIG. 6 is given as

N(515)={258, 259, 230, 514, 516, 770, 771, 772}

The boundary candidate set C makes candidates to a contour point of the brain.

Then, neighboring points N(c) to each point (boundary candidate point) c which belongs to the boundary candidate set are determined (step A3 of FIG. 3).

Then, values of the region belonging probability regarding all of the points which belong to the neighboring point set N(c) are sent to the region belonging discrimination section 6, which thus discriminates whether or not the points are region internal points (step A4 of FIG. 3).

If it is discriminated in step A4 that all of the points of the neighboring point set N(c) of the boundary candidate point c are region internal points, then since this signifies that the point c is surrounded by region internal points, the point c is added to the region internal point set R (step A5 of FIG. 3).

If the neighboring point set N(c) to the boundary candidate point c includes at least one point which is not a region internal point, then since this signifies that the boundary candidate set C is proximate to a point outside the region, the boundary candidate point c is added to the boundary point set B (step A6 of FIG. 3).

Then, if the points which belong to the neighboring points N(c) include a point or points which have been discriminated to be region internal points but are not yet added to the region internal point set R, then those points are added to the boundary candidate set C (step A7 of FIG. 3).

In step A8 of FIG. 3, it is discriminated whether or not a new point has been added to the boundary candidate set. If a new point has been added, then the processing returns to step A3, but if no new point has been added, then the processing advances to step 109 of FIG. 1 because the region extraction has been completed.

By repeating the processing in steps A3 to A8 of FIG. 3 until no newly added point is detected any more, the boundary point set B which is a set of points which represent the contour of the brain is obtained finally.

The region belonging discrimination section 6 sends the boundary point set B and the region internal point set R obtained in this manner to the boundary extraction section 7.

The boundary extraction section 7 extracts the contour based on the region internal point set R obtained by the region belonging discrimination section 6.

The boundary point set B obtained by the region belonging discrimination section 6 may not sometimes be utilized in some application because the sequential order of the boundary points is not taken into consideration. For example, in order to produce computer graphics of the head of a human being using contour data extracted as described above, an ordered set of polygons must be produced. To this end, however, data of the boundary points must be in an ordered state.

The boundary extraction section 7 is used to produce ordered boundary points.

A detailed procedure is described. First, for example, four points are selected from within the boundary point set B. The selected points are decided as an initial set to an ordered boundary point set B' and represented as B'={b1, b2, b3, b4} (step B1 of FIG. 4). The initial set to the boundary point set need not necessarily include four points, but should include three or more points.

As an ordering direction, for example, the points of the boundary point set B' are ordered such that, when they are followed in order of b1→b2→b3→b4→b1, a closed loop in the clockwise direction may be drawn on a two-dimensional picture image. The ordering direction, however, is not limited to this and may be a counterclockwise direction, but the direction should be uniform among all boundary point sets.

Then, an intermediate point is added between each two adjacent ones of the boundary points which belong to the boundary point set B' (step B2 of FIG. 4). The new set is represented as, for example, {b1, b12, b2, b23, b3, b34, b4, b41}. For each intermediate point, for example, for the intermediate point b12, a point by which a straight line interconnecting the two points b1 and b2 is divided equally is used.

Then, it is checked whether or not each of the newly added intermediate points (in the case described above, b12, b23, b34 and b41) is a boundary point (step B3 of FIG. 4).

If each of the newly added intermediate points is a boundary point, then it is adopted as a point which belongs to the boundary point set B', and the processing advances to step B4. If any of the newly added intermediate points is not a boundary point, then the processing advances to step B5 of FIG. 4.

In step B4 of FIG. 4, it is checked whether or not a new intermediate point can be added to the boundary point set B' at the point of time when all of the intermediate points are determined as boundary points. If a new intermediate point can be added, then the processing advances to step B2. However, if no new intermediate point can be added in step B4, then the processing advances to step 110 of FIG. 2, in which the ordered boundary point set B' which is a result of the contour extraction is outputted, where by the processing is ended. The case wherein no new intermediate point can be added is, for example, a case wherein all of adjacent ones of the points which belong to the boundary point set B' are adjacent each other and no intermediate point is present between them. Accordingly, this signifies that all of the boundary points connect to each other and a desired contour line is obtained.

If an intermediate point is not a boundary point in step B3 of FIG. 4, then it is checked whether or not the intermediate point is a region internal point, and if the intermediate point is a region internal point, then the intermediate point is moved by one pixel distance toward the outer side of the region (step B6 of FIG. 4).

However, if the intermediate point is not a region internal point, then the intermediate point is moved by one pixel distance toward the inner side of the region (step B7 of FIG. 4). After the intermediate is moved toward the outer side or the inner side of the region, the processing advances to step B3, in which it is discriminated whether or not the intermediate point is a boundary point.

The processes and the functions of the data analysis section 1, region belonging probability calculation section 2, parameter updating section 3, evaluation function calculation section 4, region delimiting section 5, region belonging discrimination section 6 and boundary extraction section 7 of the contour extraction apparatus described above may be implemented by a program executed by a computer which forms an image processing apparatus or by an image signal processing processor. In this instance, the program or firmware which controls the processes is realized in accordance with the flow charts described hereinabove, and is read out from a recording medium, on which the program (firmware) is stored, by a reading apparatus for the recording medium into a main storage unit of the computer and executed by the computer thereby to realize the functions of the components mentioned above to carry out the present invention.

Now, a second embodiment of the present invention is described. It is to be noted that overlapping description of those processes in the second embodiment which are common to those in the first embodiment is omitted herein to avoid redundancy.

Figure 7:
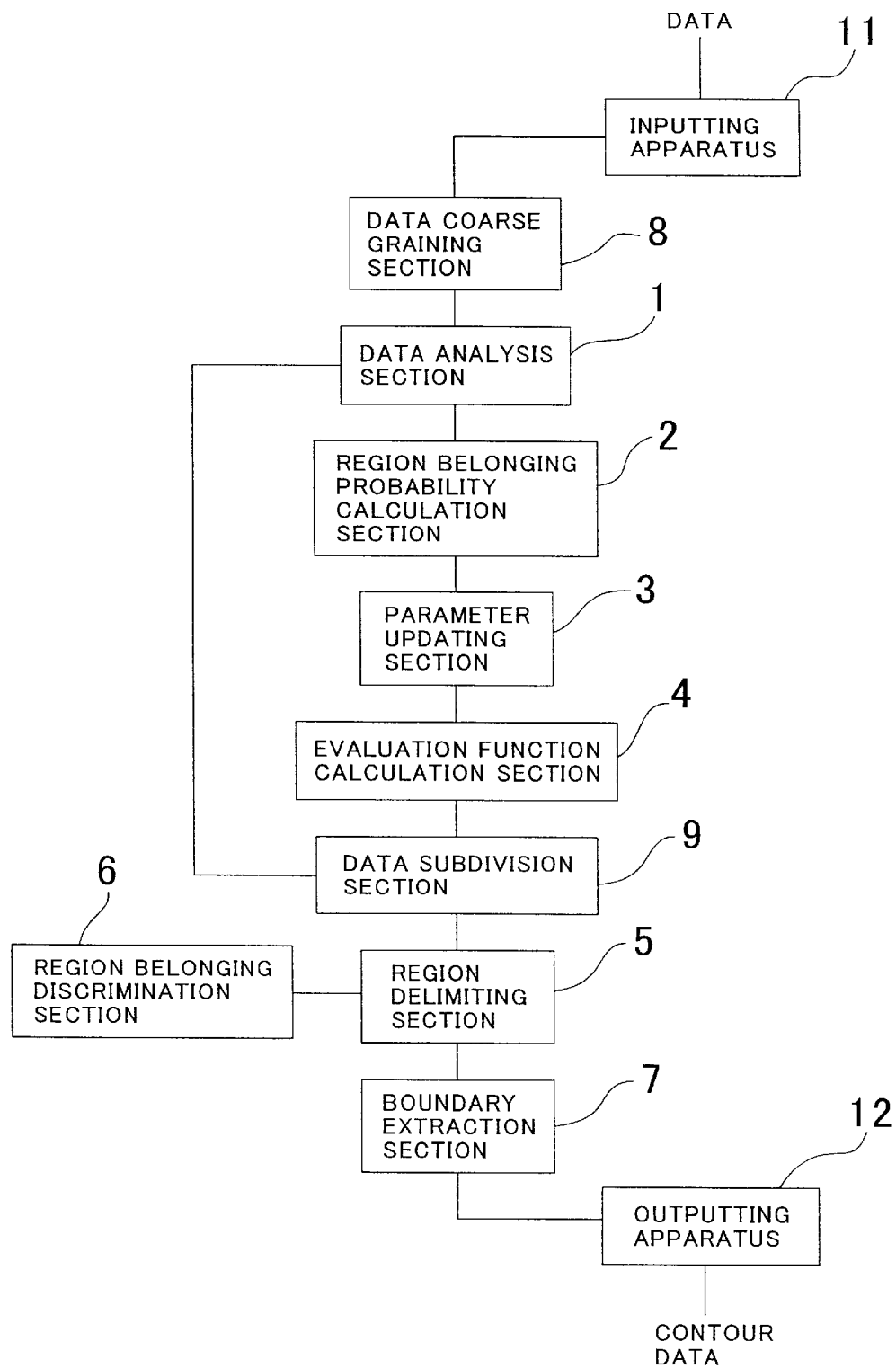
FIG. 7 is a block diagram showing another contour extraction apparatus to which the present invention is applied.

FIG. 7 shows a contour extraction apparatus according to the second embodiment of the present invention. Referring to FIG. 7, the contour extraction apparatus shown is a modification to and is different from the contour extraction apparatus of FIG. 1 in that it additionally includes a data coarse graining section 8 for coarse graining a given image, and a data subdivision section 9 for subdividing data in a coarse grained state.

Now, processing of the contour extraction apparatus of the second embodiment of the present invention is described with reference to FIG. 8.

The contour extraction apparatus first performs, in step 101, processing similar to the processing in step 101 described hereinabove with reference to FIG. 1 and then coarse grains a resulting image by means of the data coarse graining section 8. A detailed method of the coarse graining is described below.

For example, in 2×2 coarse graining, a sum of pixel values of the pixels $\{1, 2, 257, 258\}$ shown in FIG. 6 is calculated first and then the sum is divided by the number of pixels, that is, 4, to determine a mean value, and the mean value is decided as a value of the pixel number 1 of the coarse grained data.

Similarly, a pixel set of the pixel numbers $\{3, 4, 259, 260\}$ is coarse grained to obtain a value of the pixel number 2 of the coarse grained data.

The procedure described is performed for all sets of 2×2 pixels which do not overlap with each other to obtain a set of coarse grained picture image data. The size of the coarse graining is not limited to 2×2, and such coarse graining can be performed similarly with any other size.

The procedure of coarse graining described above decreases the number of object pixels of analysis to ¼ and thus decreases the processing time for contour extraction.

Further, since the coarse graining smoothes the picture image, an influence of stain or fine surface roughness independent of the original contour can be reduced. The data coarse graining section 8 sends the data obtained by the coarse graining to the data analysis section 1.

Thereafter, the processes in steps 102 to 107 described hereinabove with reference to FIG. 2 are executed to complete optimization of an evaluation function. Then in step 112, it is checked whether or not the coarse grained picture image can be subdivided.

For example, if the first coarse graining is performed with the size of 16×16, then the coarse graining in the next cycle is performed with the size of, for example, 8×8. This is repeated until the size of the coarse graining is reduced to 1×1. In this instance, no further coarse graining can be executed. Consequently, the processing advances to step 108. If coarse graining is possible in step 112, then the processing advances to step 113.

In step 113, the data subdivision section 9 deletes an external region portion based on values of the region belonging probability, whereafter the processing advances to step 114. The deletion of an external region portion further reduces those pixels which make an object of contour extraction and thus allows higher speed operation.

In step 114, the remaining pixels after the deletion are subdivided, and the subdivided pixel data are sent to the data analysis section 1.

Now, a detailed example wherein a contour of a region corresponding to the brain is extracted from an actual MRI picture image and evaluated using the contour extraction apparatus according to the present invention is described.

FIG. 5 illustrates MRI picture image data which make an object of contour extraction. As seen in FIG. 5, the MRI picture image data represent a picture image which includes a region corresponding to the brain, another region corresponding to the scalp, and an external region.

Figure 8:
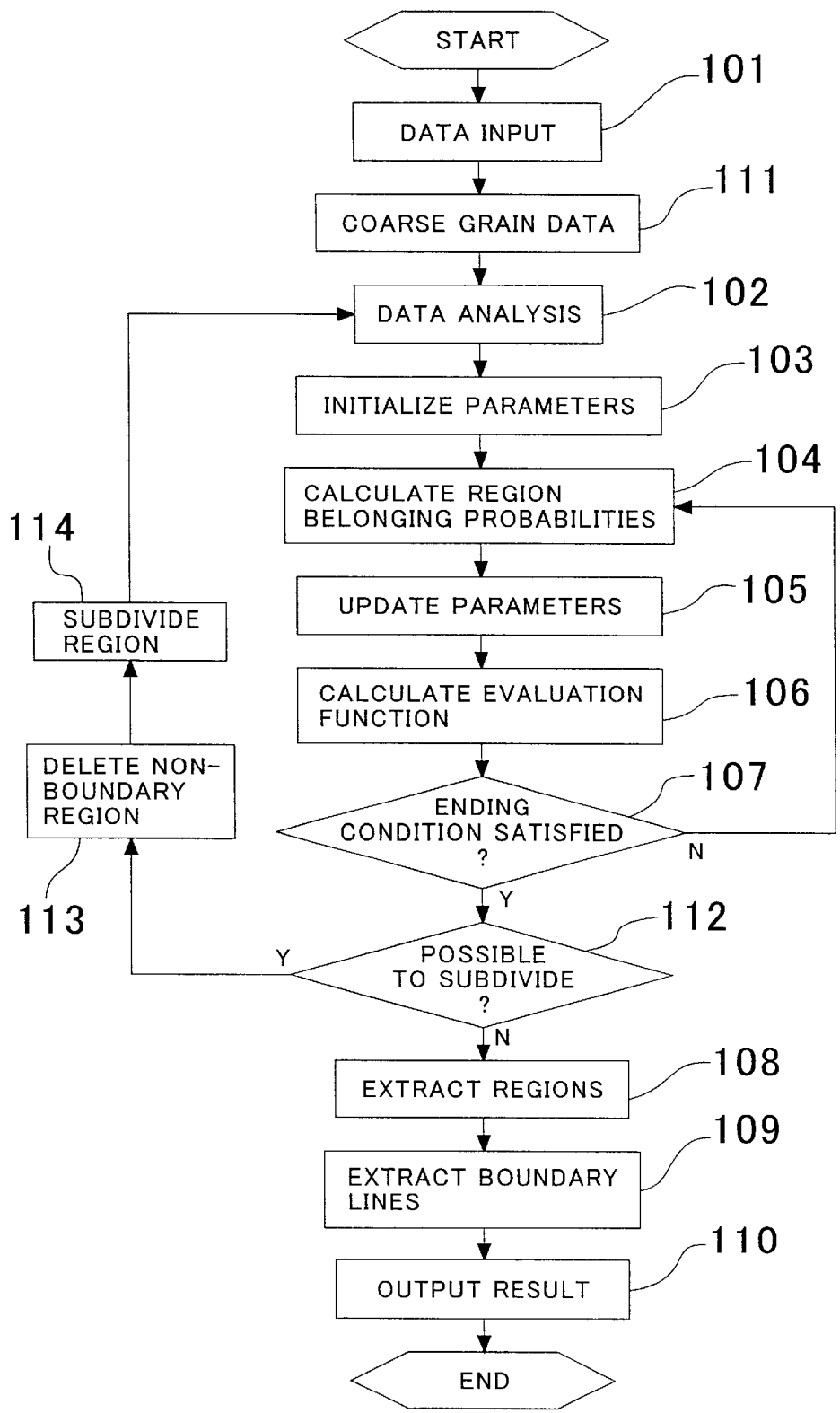
FIG. 8 is a flowchart illustrating operation of the contour extraction apparatus of FIG. 7.
Figure 9:
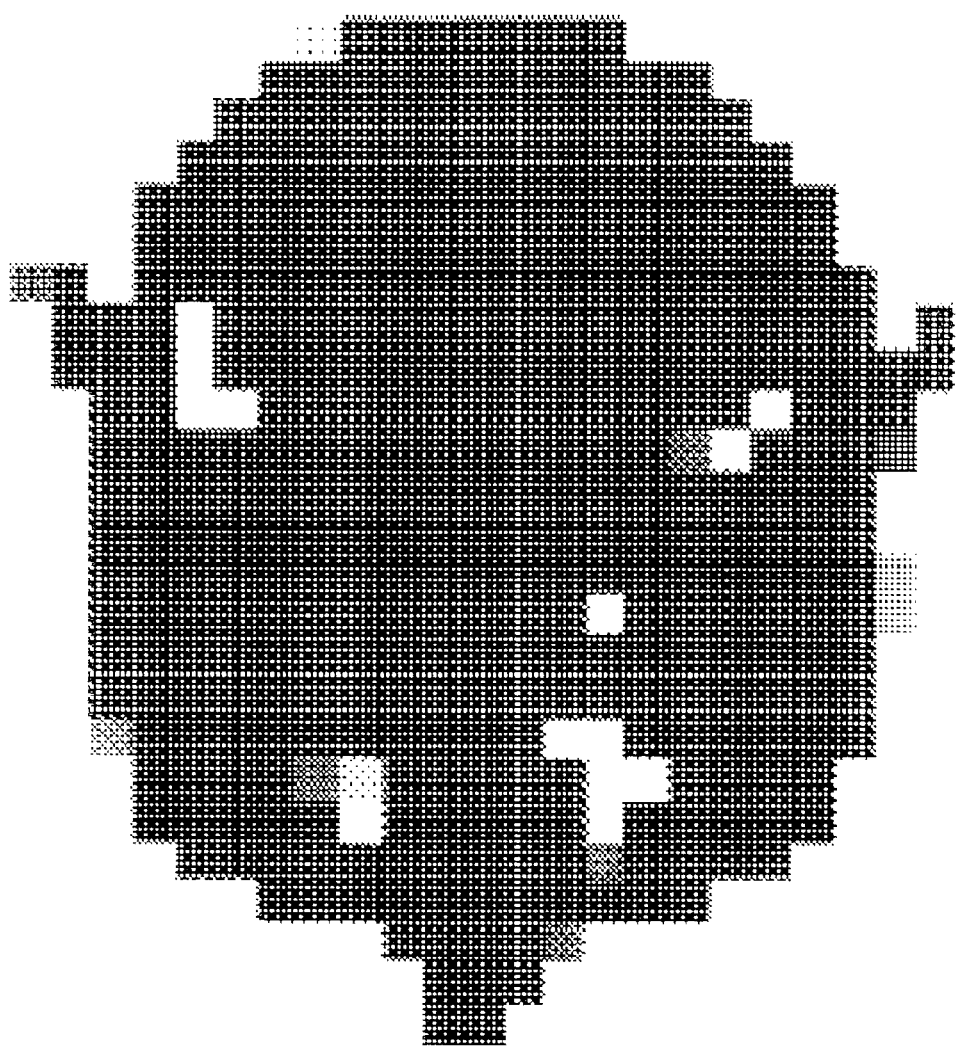
FIG. 9 is a view illustrating a distribution of region belonging probabilities with which points of a picture image belong to an outside region of the head of a human being.
Figure 10:
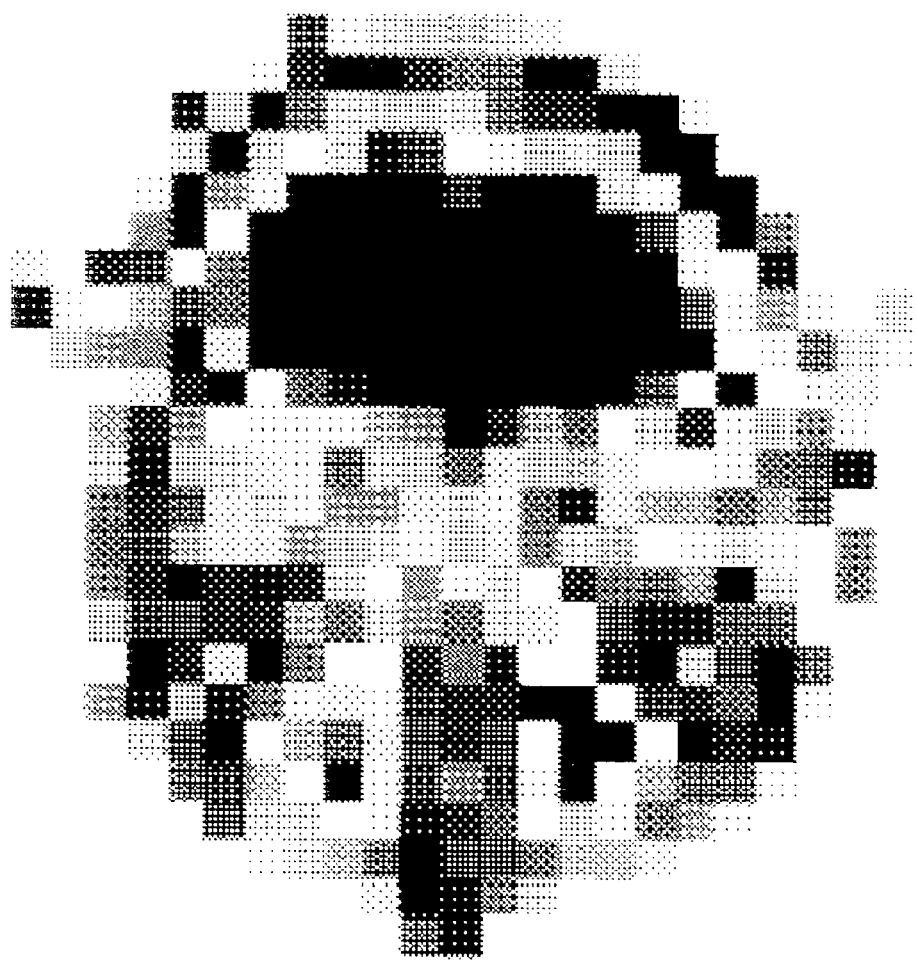
FIG. 10 is a similar view but illustrating a distribution of region belonging probabilities with which the points of the picture image belong to a region of the scalp.
Figure 11:
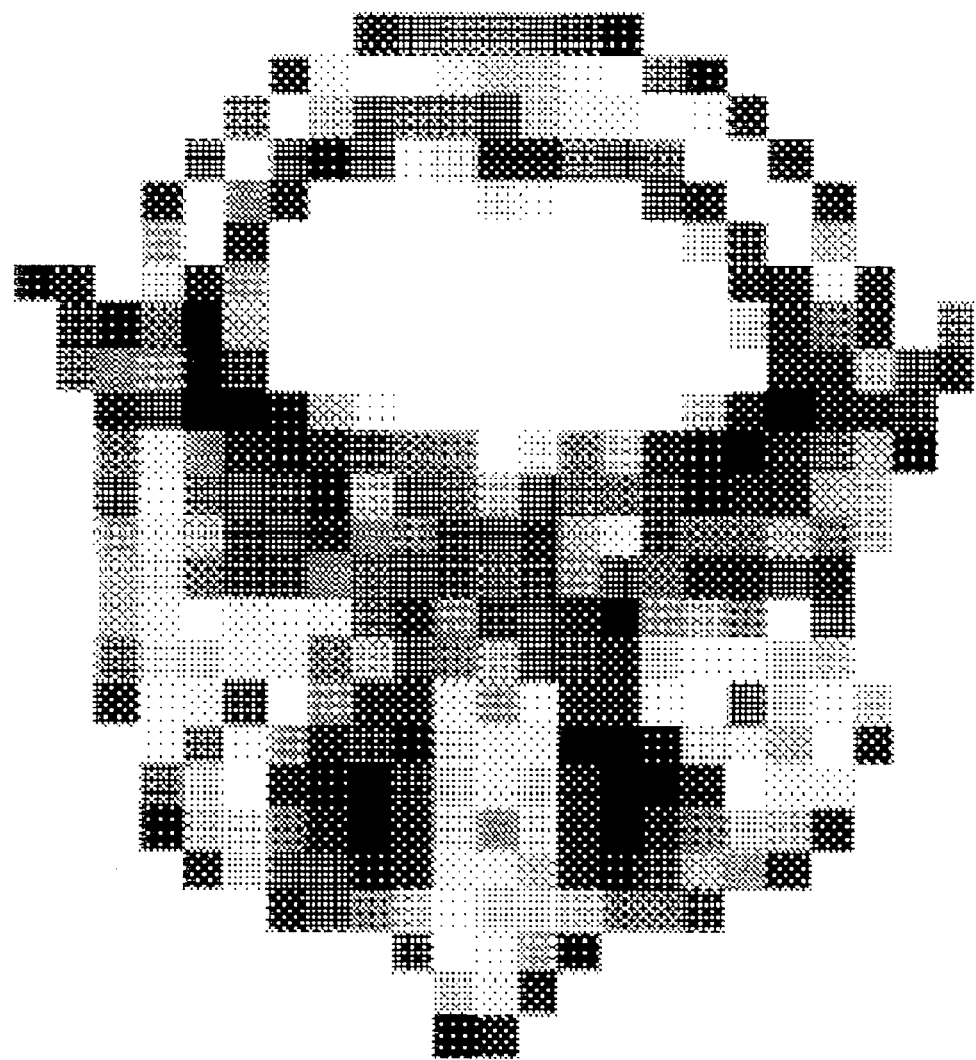
FIG. 11 is a similar view but illustrating a distribution of region belonging probabilities with which the points of the picture image belong to a region of the brain.

The contour extraction method of the present invention is applied to the picture image of FIG. 8 to determine region belonging probabilities to the individual regions, and results are illustrated in FIGS. 9, 10 and 11.

Here, 16×16 coarse graining has been performed to determine region belonging distributions. FIG. 9 illustrates a probability distribution with which the pixels belong to the external region, and in FIG. 9, those pixels which have higher probabilities with which they belong to the external region are indicated in brighter white. Similarly, FIG. 10 illustrates a probability distribution with which the pixels belong to the scalp region, and FIG. 11 illustrates a probability distribution with which the pixels belong to the brain region. As can be apparently seen from FIGS. 9 to 11, it can be regarded that coarse region delimitation is almost completed at a point of time when the region belonging probabilities are determined.

Figure 12:
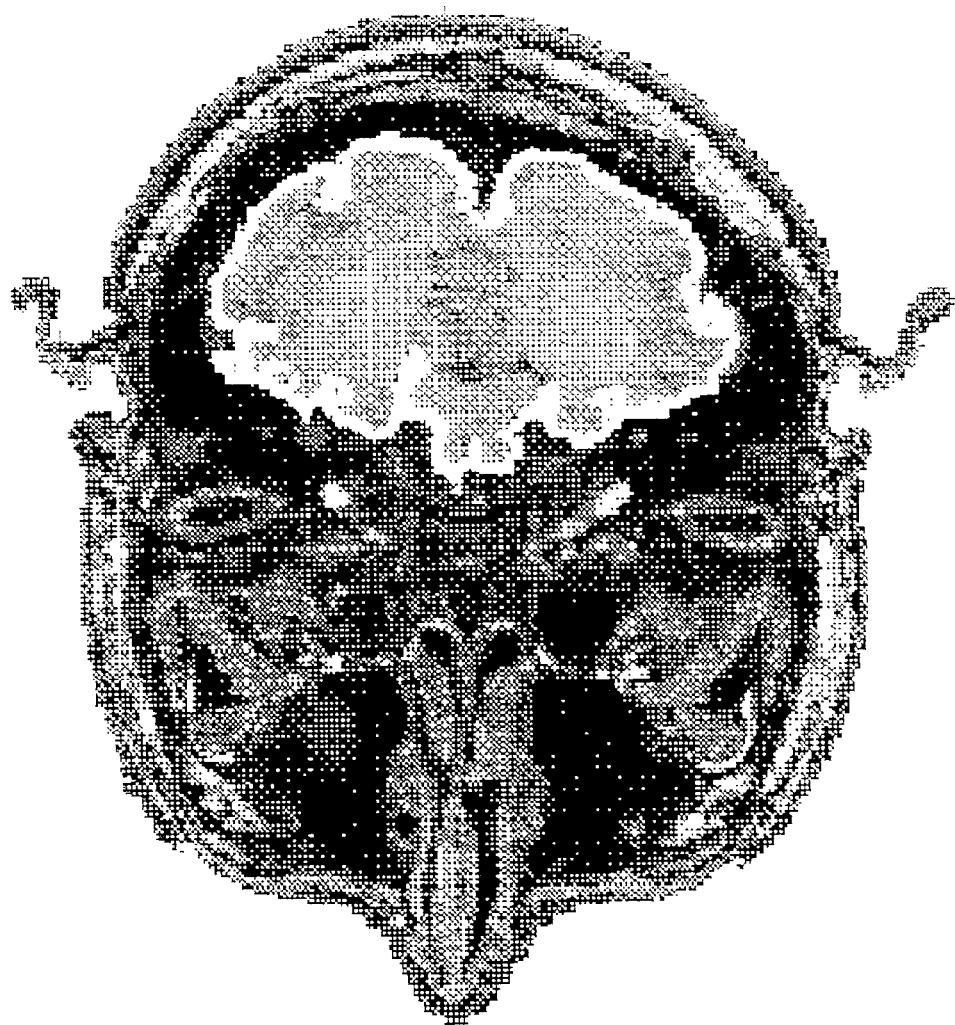
FIG. 12 is a similar view illustrating a result of contour extraction performed for the region of the brain.

FIG. 12 shows a contour of the brain extracted by applying the contour extraction method of the present invention. It can be seen that, although the original MRI picture image includes pixels of high luminance also in the regions other than the brain, the contour of the brain is successfully extracted with accuracy without extracting such pixels in error.

While preferred embodiments of the present invention have been described using specific terms, such description is for illustrative purpose only, and it is to be understood that changes and variations may be made without departing from the spirit or scope of the following claims.

What is claimed is:

1. A contour extraction method for delimiting, from picture image data of a picture image including an image of a body that includes an object of contour extraction, regions to which individual points of the picture image belong based on attributes of the points of the picture image and extracting a boundary between the regions as a contour, the method comprising:

(a) initializing parameters which define mixed probability distributions of the attributes of the points of the picture image;

(b) calculating region belonging probabilities with respect to the points of the picture image;

(c) updating the parameters so that the mixed probability distributions may be increased;

(d) calculating an evaluation function to be used as a scale for favorableness of estimation from the mixed probability distributions defined by the updated parameters;

(e) delimiting the regions to which the points of the picture image belong based on the region belonging probabilities;

(f) extracting a boundary between the delimited regions; and (g) discriminating, based on the region belonging probabilities, whether or not the points of the picture image are region internal points, which are points within a determined one of the regions, or region external points, which are points outside the determined region.

2. The contour extraction method as claimed in claim 1, wherein steps (b), (c) and (d) are repetitively performed until a predetermined condition is satisfied.

3. The contour extraction method as claimed in claim 2, wherein step (f) of extracting a boundary between the delimited regions includes:

setting an initial value to an ordered boundary point set;

adding an intermediate point between adjacent ones of those points which belong to the ordered boundary point set;

moving the intermediate point until the intermediate point becomes a boundary point and repeating the addition of an intermediate point and the movement while a new intermediate point can be added; and adding, upon the movement of each of the intermediate points, the intermediate point to the ordered boundary point set if the intermediate point already is a boundary point, but moving the intermediate point toward the outer side of the region if the intermediate point is a region internal point, but otherwise moving the intermediate point toward the inner side of the region if the intermediate point is a region external point.

4. The contour extraction method as claimed in claim 1, wherein step (e) of delimiting the regions to which the points of the picture image belong includes:

determining one region internal point and setting the region internal point as an initial set to a region internal point set;

acquiring neighboring points to the point belonging to the region internal point set and setting the neighboring points as an initial set to a boundary candidate set;

selecting one of the points of the boundary candidate set which belongs to the region internal point set and adding the selected point to the region internal, point set;

sending, when there remains no point to be newly added to the region internal point set, the region internal point discriminated at step (g);

acquiring, when the region internal point set is to be selected, neighboring points to each of the points belonging to the boundary candidate set and adding the points which belong to the boundary candidate set to the region internal point set if all of the neighboring points are region internal points;

adding, if the neighboring points include at least one region external point, the point or points which belong to the boundary candidate set to a boundary point set; and adding one or those of the region internal points belonging to the neighboring points which are not added to the region internal point set to the boundary candidate set.

5. The contour extraction method as claimed in claim 4, wherein step (f) of extracting a boundary between the delimited regions includes the steps of:

setting an initial value to an ordered boundary point set;

adding an intermediate point between adjacent ones of those points which belong to the ordered boundary point set;

moving the intermediate point until the intermediate point becomes a boundary point and repeating the addition of an intermediate point and the movement while a new intermediate point can be added; and adding, upon the movement of each of the intermediate points, the intermediate point to the ordered boundary point set if the intermediate point already is a boundary point, but moving the intermediate point toward the outer side of the region if the intermediate point is a region internal point, but otherwise moving the intermediate point toward the inner side of the region if the intermediate point is a region external point.

6. The contour extraction method as claimed in claim 1, further comprising:

(h) coarse graining the picture image;

(i) subdividing the coarse grained picture image; and (j) deleting those points which belong to a predetermined region with low probabilities.

7. The contour extraction method as claimed in claim 1, wherein the mixed probability distribution is used as the evaluation function.

8. The contour extraction method as claimed in claim 1, wherein a structural risk calculated from the mixed probability distribution and a number of the parameters is used as the evaluation function.

9. The contour extraction method as claimed in claim 1, wherein a description length calculated from the mixed probability distribution and a number of the parameters is used as the evaluation function.

10. The contour extraction method as claimed in claim 1, wherein Akaike information criteria calculated from the mixed probability distribution and a number of the parameters are used as the evaluation function.

11. A contour extraction apparatus for delimiting, from picture image data of a picture image including an image of a body which makes an object of contour extraction, regions to which individual points of the picture image belong based on attributes of the points of the picture image and extracting a boundary between the regions as a contour, comprising:

first means for initializing parameters which define a mixed probability distributions of the attributes of the points of the picture image;

second means for calculating expected values of a region belonging probability with which the points of the picture image belong individually to the regions;

third means for updating the parameters so that the mixed probability distributions may be increased;

fourth means for calculating an evaluation function to be used as a scale for favorableness of estimation from the mixed probability distributions defined by the updated parameters;

fifth means for delimiting the regions to which the points of the picture image belong based on the values of the region belonging probabilities;

sixth means for extracting a boundary between the delimited regions; and seventh means for discriminating based on the region belonging probabilities whether or not the points of the picture image are region internal points which are points within a determined one of the regions or region external points which are points outside the determined region.

12. The contour extraction apparatus as claimed in claim 11, further comprising:

eighth means for coarse graining the picture image;

ninth means for subdividing the coarse grained picture image; and tenth means for deleting those points which belong to a predetermined region with low probabilities.

13. A region contour extraction method, comprising:

receiving picture image data of a picture image including an image of a body that includes an object of contour extraction from inputting means;

calculating region belonging probabilities with respect to which individual points of the picture image belong to regions based on attributes of the points of the picture image;

delimiting the regions to which the individual points of the picture image belong using the region belonging probabilities; and extracting a boundary between the regions as a contour.

14. A region contour extraction method, comprising:

calculating, from picture image data of a picture image inputted from inputting means and including an image of a body which makes an object of contour extraction, expected values of a region belonging probability with which individual points of the picture image belong to regions based on attributes of the points of the picture image;

updating parameters which define a mixed probability distribution of the attributes of the points of the picture delimiting the regions to which the individual points image;

calculating an evaluation function based on the mixed probability distribution calculated from the region belonging probabilities and the parameters; and delimiting the regions based on the region belonging probabilities when the evaluation function satisfies a predetermined condition and extracting a contour based on the delimited regions.

15. A contour extraction apparatus, comprising:

a data analysis section for analyzing a characteristic of image data of a picture image inputted from an inputting apparatus to determine initial values to region parameters which characterize regions of the picture image;

a region belonging probability calculation section for calculating region belonging probabilities with which individual points of the picture image belong to the regions based on values of the points of the picture image;

a parameter updating section for updating the region parameters so that a value of an evaluation function may be increased or decreased depending upon the evaluation function employed;

an evaluation function calculation section for calculating the evaluation function from the updated region parameters;

a region delimiting section for deciding, when the evaluation function satisfies an ending condition determined in advance, to which one of the regions each of the points of the picture image belongs based on the estimated region belonging probabilities;

a region belonging discrimination section for discriminating whether or not a designated one of the points of the picture image which make a boundary between the regions belongs to a designated one of the regions;

a boundary extraction section for producing an ordered contour line from the extracted region; and an outputting apparatus for outputting a result of the contour extraction.

16. The contour extraction apparatus as claimed in claim 15, wherein, when a difference between a value of the evaluation function calculated by said evaluation function calculation section and a value of the evaluation function calculated last using the region parameters before updated is higher than a predetermined value, said region belonging probability calculation section calculates the region belonging probabilities again using the updated region parameters and then the updating of the region parameters by said parameter updating section and the calculation of the evaluation function by said evaluation function calculation section are performed, but when the difference is equal to or lower than the predetermined value, the region parameters and the region belonging probabilities with which a mixed probability distribution which is a weighted mean of the probabilities of the values of the points of the picture image in each of the regions is determined and said evaluation function calculation section sends, after the maximization of the mixed probability distribution is completed, the resulting region belonging probabilities and region parameters to said region delimiting section.

17. The contour extraction apparatus as claimed in claim 15, wherein said region delimiting section includes:

means for determining a first region internal point, acquiring neighboring points to the region internal point and deciding the neighboring points as a first boundary candidate point set;

means for acquiring neighboring points to any of the boundary candidate points;

means for adding any of the boundary candidate points to a region internal point set when all of the neighboring points to the boundary candidate point are region internal points but adding the boundary candidate point to a boundary point set when all of the neighboring points to the boundary candidate point are not region internal points; and means for adding those of the region internal points belonging to the neighboring points to any of the boundary candidate points which are not registered in the region internal point set to the boundary candidate point set; and wherein, when a point is added to the boundary candidate point set, the processing is repeated beginning with said means for acquiring neighboring points to the boundary candidate points.

18. The contour extraction apparatus as claimed in claim 15, wherein said boundary extraction section includes:

means for selecting a predetermined number of points from within the boundary point set and deciding the selected points as an initial set to an ordered boundary point set;

means for adding intermediate points between adjacent ones of the boundary points belonging to the ordered boundary point set;

means for checking whether or not the newly added intermediate points are boundary points;

means for adopting, if any of the intermediate points is a boundary point, the intermediate point as a point which belongs to the ordered boundary point set, checking whether or not a new intermediate point can be added at a point of time when all of the intermediate points are decided as boundary points, and causing, if a new intermediate point can be added, the processing of said means for adding intermediate points to be performed, but outputting, if a new intermediate point cannot be added, the ordered boundary point set which is a result of the contour extraction;

means for checking, when any of the intermediate points is not a boundary point, whether or not the intermediate point is a region internal point and moving, if the intermediate point is a region internal point, the intermediate point toward the outer side of the region, but moving, if the intermediate point is not a region internal point, the intermediate point toward the inner side of the region; and means for checking, when any of the intermediate points is moved toward the outer side or the inner side of the region, whether or not the intermediate point is a boundary point.

19. The contour extraction apparatus as claimed in claim 15, further comprising:

a data coarse graining section for coarse graining the picture image data inputted from said inputting apparatus and outputting the coarse grained picture image data to said data analysis section; and a data subdivision section for deleting, when the evaluation function calculated by said evaluation function calculation section satisfies the ending condition determined in advance, if subdivision is possible, an external region portion based on the region belonging probabilities, subdividing those points of the picture image which remain after the deletion and sending resulting picture image data to said data analysis section.

20. A recording medium on which a program to be executed by a computer is recorded, the program comprising:

a data analysis step of analyzing a characteristic of image data of a picture image inputted from an inputting apparatus to determine initial values to region parameters which characterize regions of the picture image;

a region belonging probability calculation step of calculating region belonging probabilities with which individual points of the picture image belong to the regions based on values of the points of the picture image;

a parameter updating step of updating the region parameters so that a value of an evaluation function may be increased or decreased depending upon the evaluation function employed;

an evaluation function calculation step of calculating the evaluation function from the updated region parameters;

a region delimiting step off deciding, when the evaluation function satisfies an ending condition determined in advance, to which one of the regions each of the points of the picture image belongs based on the estimated region belonging probabilities;

a region belonging discrimination step of discriminating whether or not a designated one of the points of the picture image which make a boundary between the regions belongs to a designated one of the regions; and a boundary extraction step of producing an ordered contour line from the extracted region.

\* \* \* \* \*